United States Patent
O'Brien, Jr. et al.

(10) Patent No.: US 6,597,634 B2
(45) Date of Patent: Jul. 22, 2003

(54) SYSTEM AND METHOD FOR STOCHASTIC CHARACTERIZATION OF SPARSE, FOUR-DIMENSIONAL, UNDERWATER-SOUND SIGNALS

(75) Inventors: Francis J. O'Brien, Jr., Newport, RI (US); Chung T. Nguyen, Austin, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/934,343

(22) Filed: Aug. 22, 2001

(65) Prior Publication Data
US 2003/0043695 A1 Mar. 6, 2003

(51) Int. Cl.[7] .................................................. G06F 7/00
(52) U.S. Cl. ....................................................... 367/135
(58) Field of Search ................................ 367/135, 901, 367/21; 375/346, 316; 708/200

(56) References Cited

U.S. PATENT DOCUMENTS

| | | | | |
|---|---|---|---|---|
| 5,703,906 A | * | 12/1997 | O'Brien et al. | 367/21 |
| 5,963,591 A | * | 10/1999 | O'Brien et al. | 375/346 |
| 5,966,414 A | * | 10/1999 | O'Brien, Jr. | 375/346 |
| 6,397,234 B1 | * | 5/2002 | O'Brien et al. | 708/200 |

OTHER PUBLICATIONS

Rekkas et al.;Three–Dimensional Tracking Using On–Board Measurements; Jul. 1991;IEEE Transactions on Aerospace and Electronic Systems vol. 27, No. 4.*

* cited by examiner

Primary Examiner—Daniel T. Pihulic
(74) Attorney, Agent, or Firm—James M. Kasischke; Michael F. Oglo; Jean-Paul A. Nasser

(57) ABSTRACT

A signal processing system provides and processes a digital signal, converted from to an analog signal, which includes a noise component and possibly also an information component comprising small samples representing four mutually orthogonal items of measurement information representable as a sample point in a symbolic Cartesian four-dimensional spatial reference system. An information processing sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The information processing system is illustrated as combat control equipment for undersea warfare, which utilizes a sonar signal produced by a towed linear transducer array, and whose mode operation employs four mutually orthogonal items of measurement information.

6 Claims, 4 Drawing Sheets

SYSTEM AND METHOD FOR STOCHASTIC CHARACTERIZATION OF SPARSE, FOUR-DIMENSIONAL, UNDERWATER-SOUND SIGNALS

CROSS REFERENCE TO RELATED APPLICATION

The instant application is related to commonly assigned U.S. Patent Applications entitled SYSTEM AND APPARATUS FOR THE DETECTION OF RANDOMNESS IN TIME SERIES DISTRIBUTIONS MADE UP OF SPARSE DATA SETS, Serial No. 09/379,210, filed Aug. 20, 1999, now U.S. Pat. No. 6,397,234 (Attorney Docket No. 78645) and SYSTEM AND APPARATUS FOR STOCHASTIC RANDOMNESS DETECTION OF WHITE NOISE IN THREE DIMENSIONAL TIME SERIES DISTRIBUTIONS, Serial No. 09/678,877, filed Oct. 4, 2000, now U.S. Pat. No. 6,466,516 (Attorney Docket No. 79920).

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The invention relates generally to the field of systems and methods for performing digital signal processing operations in connection with signals and more particularly to systems and methods for characterizing signals to determine their stochastic properties, that is, to determine whether they are random. More particularly it relates to a system for performing this function of characterizing signals that represent information on small samples, which in turn is representable as a composite of four component items of mutually orthogonal measurement information. If the signals are random, they may be determined to constitute noise, in which case additional signal processing efforts which might be undertaken to process the signals to extract information therefrom can be avoided. Stated another way, the system and method allows a determination to be made of the extent to which a pattern of data items, or sample points representing four dimensions of measurement information conforms to a random structure of data.

(2) Description of the Prior Art

In a number of applications in which four mutually orthogonal items of measurement information undergo processing, it is desirable to be able to determine the likelihood that a signal is random. For example, an acoustic signal, received in an ocean environment, may constitute noise alone, or it may include some useful information along with a background noise. If the signal constitutes noise alone, its amplitude will be random, but if it includes information it will not be random and further processing may be useful to identify the information. In some prior art signal processing systems, it is assumed that four mutually orthogonal items of useful measurement information are present in the signal, and the signal is processed to try to extract this intelligence. It may be the case that the noise level of a received signal is so great that the information cannot be extracted and the processing effort will be wasted in any event. It is accordingly desirable to be able to determine the likelihood that a signal constitutes only noise, or if it also includes four mutually orthogonal items of measurement information so that a determination can be made as to whether processing of the signal to extract the information would be useful, particularly when such four-dimensional data are sparse in quantity, i.e., a small sample of measurements are available for processing the signal.

The availability of four dimensional tracking systems, comprising the processing of three sensor-based measurements and time as a fourth dimension, is well known to those skilled in the art. One such reference, hereby incorporated in its entirety, is the technical paper "Three-Dimensional Tracking Using On-Board Measurments," C. M. Rekkas, et al., *IEEE TRANSACTIONS ON AEROSPACE AND ELECTRONIC SYSTEMS*, Vol. 27, No. 4, July 1991.

A commonly assigned herewith U.S. Pat. No. 5,963,591 issued Oct. 5, 1999 discloses a system and method to characterize whether randomness is present in signal samples representable as a composite of four embedded orthogonal signal data items. One illustrative use of such a system and method is in processing underwater sound signals in connection with submarine undersea warfare, in order to spatially localize the source of emitted sound signals from a sonar contact received by a submarines towed sonar array. As a practical matter there are a number of conditions which cause data spareness, including:

(i) Extremely low data-rate (20-sec/datum in most underwater naval applications);

(ii) Naval tactical strategies require rapid maneuvering, thus data is lost in transitions;

(iii) Measurements corrupted by environmental background noise and other interferences;

(iv) Transient behaviors of underwater signals (launch signatures, sonar frequency, etc); and (v) Imperfection in physical devices.

There are a significant number of practical situations where it is desireable to process collections of signal data too sparse to yield a determination of whether or not the signal is solely random noise by the "nearest neighbor" methodology of processing taught by U.S. Pat. No. 5,963,591. Accordingly, there has been a continuing need to provide a system and method having improved capability for characterizing whether randomness is present in sparse accumulations of signals which are composited of four orthogonally related signal data items. Other prior art patents addressing systems and methods for characterizating whether randomness is present in data samples includes U.S. Pat. No. 5,966,414 issued Oct. 12, 1999, and U.S. Pat. No. 5,703,906 issued Dec. 30, 1997. (These are commonly assigned herewith also). However, none provide the teachings to address this need for characterization of presence of randomness with embedded four orthogonally related data items under conditions of sparseness of date. Likewise, an article which the inventors hereof co-authored with another co-author "Novel Method for Characterizing Stochastic Processes and Its Application in the Undersea Environment", Proceedings of the 6th International Conference on Signal Processing Applications and Technology, June 1995 does not contain disclosure of teachings to address this need.

SUMMARY OF THE INVENTION

It is therefore an object of the invention to provide a new and improved signal processing system for processing signals which may contain useful information comprised of four mutually orthogonal items of measurement information to determine the stochastic (random) properties of the signals based on small (sparse) data.

As a brief summary, the signal processing system processes a digital signal, generated in response to an analog signal which includes a noise component and possibly also another component consisting of four mutually orthogonal items of measurement information. An information processing sub-system receives the digital signal and processes it to extract the information component. A noise likelihood determination sub-system receives the digital signal and generates a random noise assessment indicative of whether the digital signal comprises solely random noise, and also a degree-of-randomness assessment indicative of the degree to which the digital signal comprises solely random noise. The operation of the information processing sub-system is controlled in response one or both of these assessments. The information processing system is illustrated as combat control equipment for submarine warfare, which utilizes a sonar signal input produced by a towed linear transducer array, and whose mode of operation employs four mutually orthogonal items of measurement information comprising: (i) clock time associated with the interval of time over which the sample point measurements are taken, (ii) conical angle representing bearing of a passive sonar contact derived from the signal produced by the towed array, (iii) a frequency characteristic of the sonar signal and (iv) a measurement of the signal-to-noise ratio (SNR) of the sonar signal.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

Figure 3:
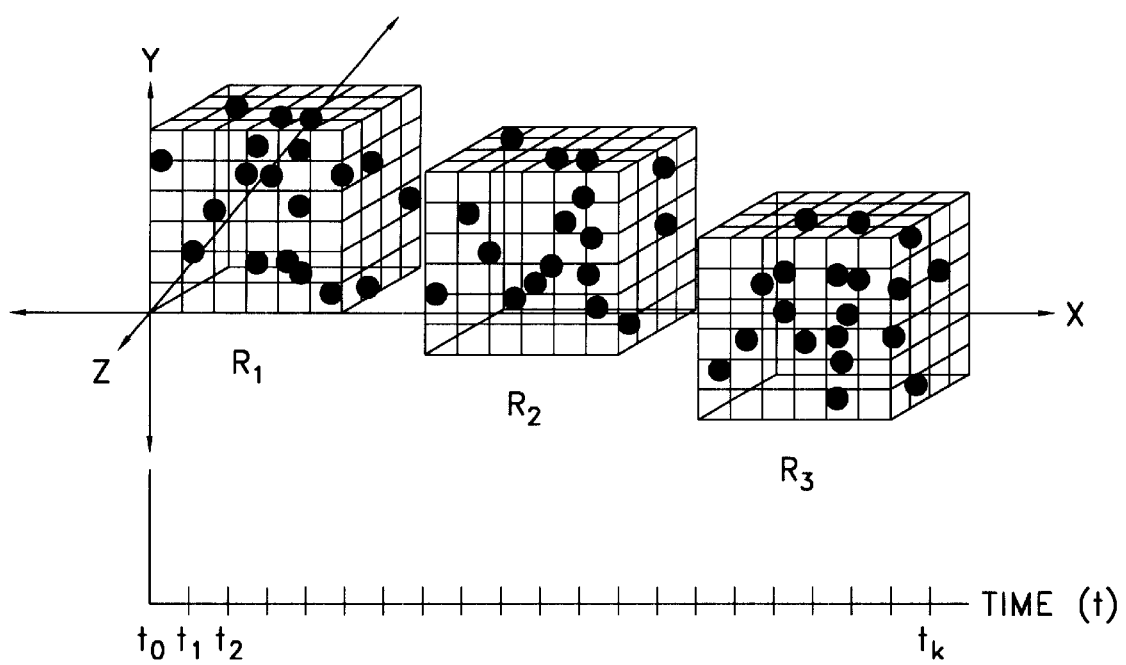
FIG. 3 is a perspective view diagrammatically representing a succession of non-overlapping, three-dimensional sample regions symbolically depicted as cubical volumes each partitioned into cubical subvolumes, each containing a population of sample point measurements, correlated with the clock time associated with the interval of time over which the sample point measurements are taken, constituting the fourth dimension information component.

The cubes in FIG. 3 have been sliced up into smaller cubes to diagrammatically highlight the new and useful improvement of the system and method. It will be appreciated that this figure is diagrammatic because represents a four-dimensional cube, that is not capable of true pictorial representation.

DESCRIPTION OF THE PREFERRED EMBODIMENT

Figure 1:
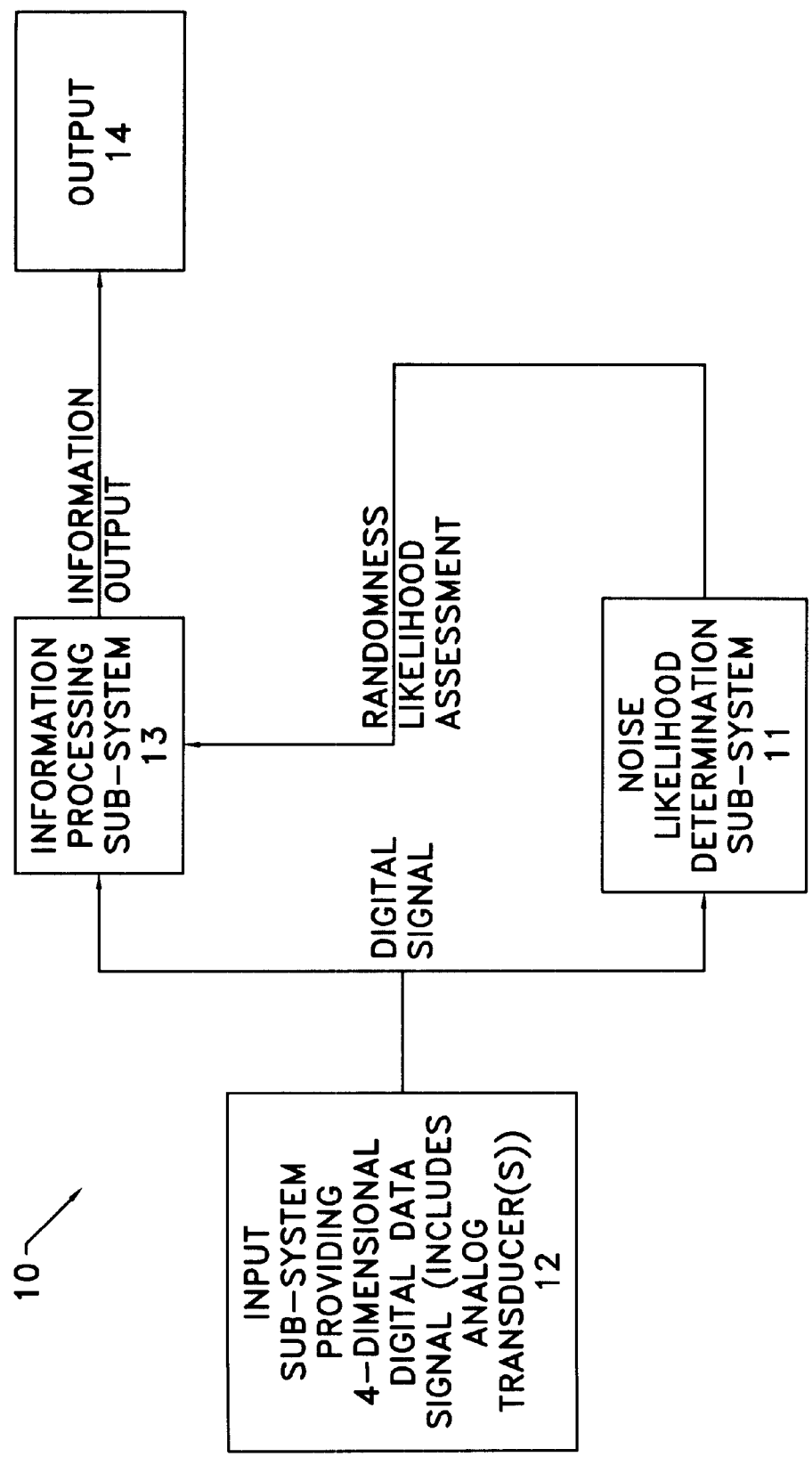
FIG. 1 is a functional block diagram of an organization for processing a signal which may contain information comprised of four items of mutually orthogonal measurement information, constructed in accordance with the invention.

The invention provides a signal processing system 10 including a noise likelihood determination sub-system 11 constructed in accordance with the invention. FIG. 1 is a functional block diagram of the signal processing system 10. With reference to FIG. 1, the signal processing system 10 includes, in addition to the noise likelihood determination sub-system 11, an input sub-system 12, an information processing sub-system 13 and an output 14. Input sub-system 12 includes one or more analog transducers, and performs a front end processing function that provides a digital output signal which represents four mutually orthogonal items of measurement information. The transducer receives the signal, which is in acoustic, electrical, electromagnetic or other form and converts it to preferably digital form for processing. For example, sub-system 12 may be embodied as sonar array transducer equipment including a front end processing stage for feeding digital data to a sub-system 13 embodied as a combat control equipment for a naval submarine. The signal provided by sub-system 12 may be a multiplexed signal representing four-dimensions of measurement information related to a passive sonar acoustic signal which emanates from a sonar contact and which is received by one or more analog transducer arrays, including a linear transducer array towed behind the submarine. Such input subsystem 12 may process the received acoustic signal to provide a multiplexed digital output of items of data (sometimes hereinafter and in the appended claims referred to as "sample points" or simply "points") comprised of a signal components representative of (i) clock-times associated with the intervals of time during which the measurement samples are generated, (ii) signal power in a sector of conical angle representing bearing of the contact, (iii) signal power in a sector or "frequency bin" of the spectral density distribution function of the acoustic signal and (iv) signal to noise ratio (SNR). The information processing sub-system 13 performs conventional signal processing operations, such as adaptive and other filtering, to extract this information component from the digital signal. In accordance with the invention, the noise likelihood determination sub-system 11 determines the likelihood that the signal is solely noise, and also provides an assessment of the degree to which the incoming signal is composed of noise. This information will determine whether sub-system 13 will provide a useful result.

The operations performed by the noise likelihood determination sub-system 11 will be described in connection with the flowcharts in FIGS. 2A and 2B. Generally, the noise likelihood determination sub-system 11 performs several tests in connection with digital signal sample points. Each digital signal sample point, or simply "point", within each population comprises one of a series of composite digital signals, with each composite signal containing components representing four mutually orthogonal items of measurement information. For example, the sample point may be in the form of a multiplexed message containing four components, each representing one of the measurement information items. Each sample point is generated in a symbolic four-dimensional aperture defined, for example, by a selected repetitive interval of time. In turn, each signal sample point is one of a series of such points in a selected population of "N" points. In the aforesaid example in which sub-system 13 is embodied as submarine combat control equipment, the characteristic of mutual orthogonality of the four items of measurement information is an inherent characteristic rooted in the nature of the fire control or contact tracking problems being solved by sub-systems 12 and 13. The series of spatial apertures used in generating the various populations may be overlapping or non-overlapping. FIG. 3 is a perspective view in which the round, black dots diagrammatically represents a sequence of digital data points, each representing a signal sample point taken at successive intervals in time. The "t" axis (which in the perspective view of FIG. 3 is the bottom horizontal axis) represents clock time and the location of a black dot relative thereto represents the time of occurrence of a spatial aperture. More particularly, it is a Cartesian representation of the instant of clock time of occurrence of some event (such as end time) of the interval of time which generates the spatial aperture. Clock time constitutes one of four mutually orthogonal items of measurement information diagrammatical depicted in FIG. 3. The "x" axis (horizontal axis in the perspective view) provides a Cartesian representation of the relationship of a another of the four mutually orthogonal items of measurement information. The "y" axis (axis perpendicular to the plane of the "t" and "x" axis in the perspective view) provides a Cartesian representation of a third of four mutually orthogonal items of measurement information, and z, which is perpendicular to the t-x-y hyperplane, provides a Cartesian representation of a fourth of the four mutually orthogonal items of measurement information. Successive populations of "N" signal sample points data are represented by successive cubical volumes (diagrammatically indicated in FIG. 3), or regions, of symbolic four-dimensional space.

Figure 2A:
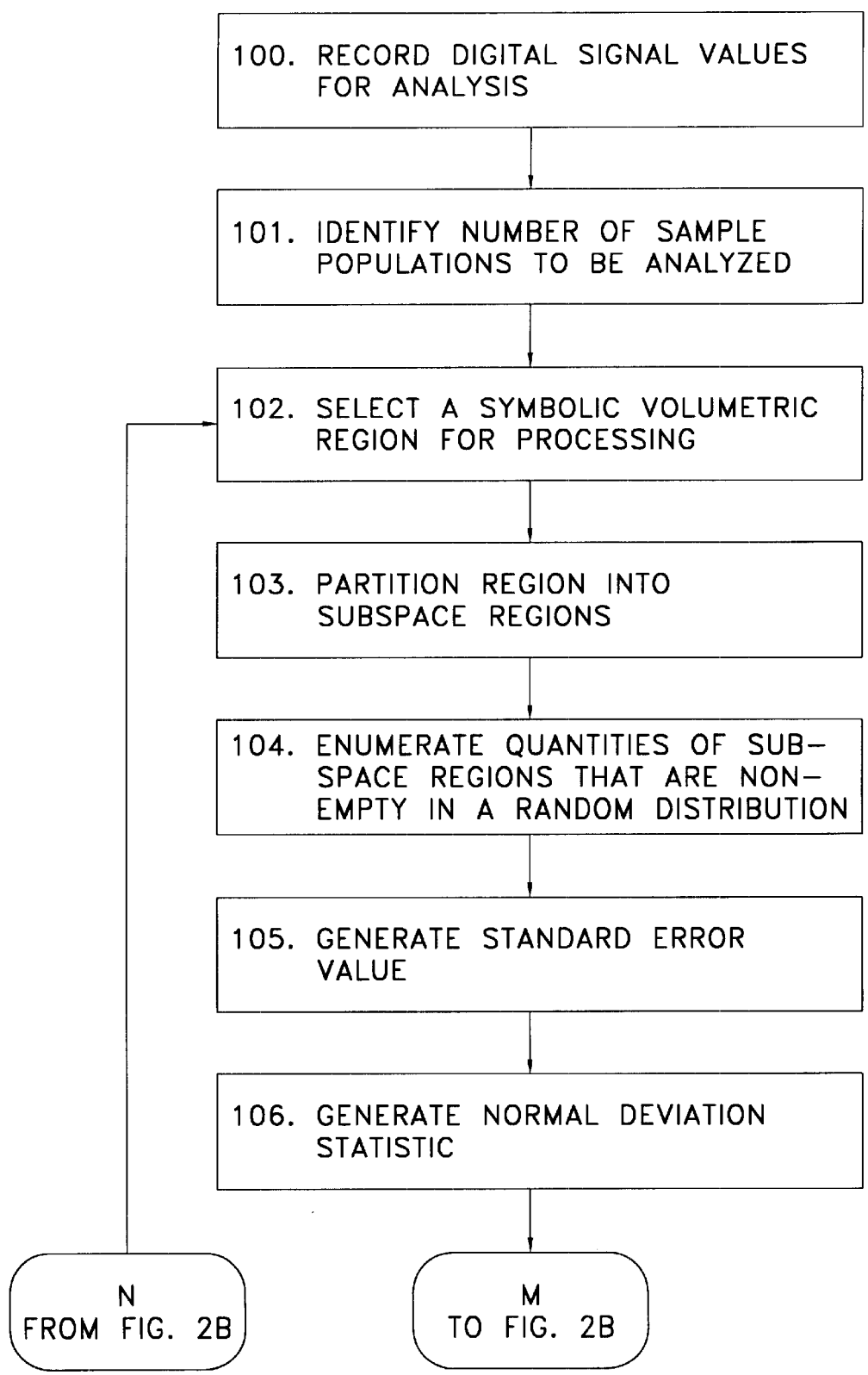
FIGS. 2A and 2B together comprise a flow chart depicting the operations of the system depicted in FIG. 1.
Figure 2B:
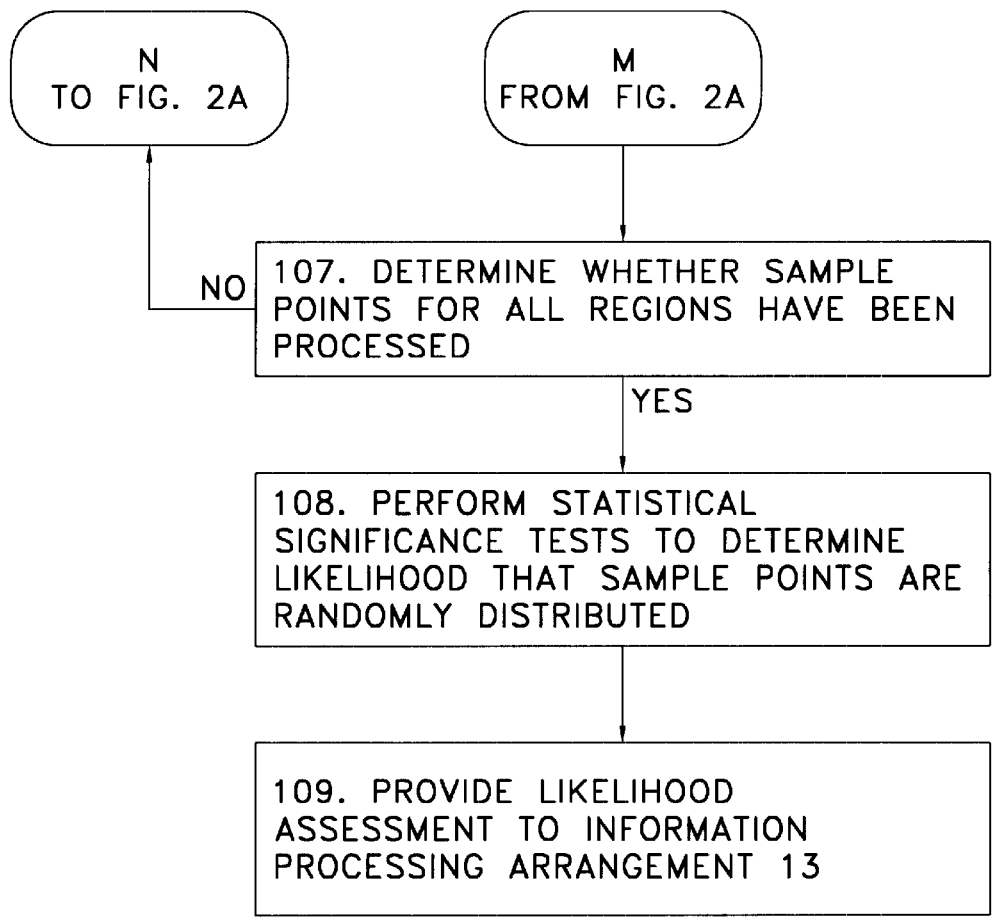

With reference again to the flow charts of FIGS. 2A and 2B, the noise likelihood determination sub-system 11 will initially record the digital values represented by the various sample points, such as shown in FIG. 3, for analysis (step 100) and identify the number of populations of sample points to be analyzed (step 101).

The noise likelihood determination sub-system 11 then proceeds to a series of iterations, in each iteration selecting one sample point population and generating several metrics useful in determining the likelihood that the sample points in the population are randomly distributed in a four-dimensional spatial region containing the sample, that is, in the portion of the Cartesian space illustrated in FIG. 3 as a t-x-y-z symbolic cubical volume containing a population, or set, of "N" of sample points. It will be appreciated that the region (cubical volume in FIG. 3) containing each population of "N" sample points is bounded (step 102) along the time axis (that is, the "t"-or bottom horizontal-axis shown in FIG. 3) by the beginning and end clock times for the region, and along each of the other three axes representing different ones of the mutually orthogonal items of measurement information (that is: the "x"-or horizontal-axis; and the "y"-or perpendicular to "t-x" plane- axis;) and "z" axis -perpendicular to all other axes- by minimum and maximum magnitudes of measurement values chosen to be inclusive of all sample points.

In each iteration, after selecting the sample point population to be analyzed during the iteration, the noise likelihood determination sub-system 11 then determines the best manner in which to partition the regions into subspace regions comprising a number k of subspaces each a cube in shape and of a determinable volume in 4-D hyperspace (step 103). The number of such subspaces that has at least one distribution point is then determined (step 104). The noise likelihood determination sub-system 11 in step 103 generates the number of partitions that are expected to be nonempty it the distribution of measurements behaves in a random manner, such a determination having been derived from the classical Poisson method introducing "k" to provide the number of subregion of the total region appropiate for small sample data processing, as $$E(M) = k(1 - e^{-N/k}) \quad (1)$$

Stated another way "E(M)" is the expected number of occupied boxes in a Poisson random distribut where E(M) represent "Expected Number," M is the actual number of subspace boxes (cubes) in 4-space nonempty across all subspace boxes in 4-D hyperspace, e is the mathematical constant 2.71828 . . . , and k is the total number of subspace cubes into which the total four-dimensional cube has been sliced.

It can be appreciated that the quantity in Eq(1) must be determined for a given dimensional cardinality, namely four. Thus to express the mathematical formula for determining the number of partitions required for optimum performance, the quantity k is determined as:

$$k = \begin{cases} k_1 & \text{if} |N - k_1| \le |N - k_2| \\ k_2 & \text{otherwise} \end{cases} \quad (2)$$

$$k_1 = [int(N^{1/4})]^4$$

$$k_2 = [int(N^{1/4}) + 1]^4$$

where "int" is the operator specifying the interger part only of a calculation.

The noise likelihood determination sub-system 11 in step 104 generates the actual number of partitions nonempty, M, as follows. An exhaustive search is made across the k subspaces, maintaining a tally of the number of partitions nonempty, and this tally is compared to the value in Equation (1) to determine if the actually tally or partitions nonempty, M, matches the theoretical value of the number of partitions nonempty, E(M), to a predetermined statistical tolerance.

Following step 104, the noise likelihood determination sub-system 11 generates a standard error value $\sigma_M$ of the number of partitions expected to be nonempty in a random population as $$\sigma_m \sqrt{k(1 - e^{-n/k})(e^{-n/k})} \quad (3)$$

where k, N, e are as hereinabove defined (step 105).

The noise likelihood determination sub-system 11 uses the values for E(M) (the average number of partitions nonempty that would be expected if the distribution were randomly distributed), M (the actual number of partitions nonempty), and the error value $\sigma_M$ to generate a normal deviation statistic $$\frac{M - E^{(M)}}{\sigma_M} \quad (4)$$

(step 106) which will be used in performing a significance test as decribed below in connection with step 108.

Following step 106, the noise likelihood determination sub-system 11 performs a series of operations to generate a second randomness identifier R, which it uses in determining the likelihood that the digital signal represents a random distribution. Subsystem 11 computes randomness identifier R in accordance with the relationship $$\frac{M}{E(M)} \quad (5)$$

where the symbols in both the numberator and the denominator are as hereinabove defined. Value of R range from 0 (all points congest onto a single plane), through 1.0 indicating pure randomness), to about 2,0 (all points are from a uniform distribution of polyhedrons) in four-dimensional symbolic space. As an illustration of the interpretive utility of R, should its value be 0.50, it is deemed in connection with the operation of system 10 that this value represents a condition of the degree-of-randomness of a stream of incoming sample points which is generally 50% random. The usefulness of this degree-of-randomness output will be illustrated later herein in conjunction with an embodiment of information processing sub-system 13 comprising submarine combat control equipment of a type which employs Bayesian-based cost function and multiple hypothesis assessment techniques to enhance effectiveness of low signal-to-noise-ration signals.

The noise likelihood determination sub-system 11 generates the values for Z (equation (4)), and R (equation (5)) for each of the plurality of populations. Accordingly, after it finishes generating the values (step 109) for one population, it returns to step 103 to perform the operations for the next population (step 107). After performing the operations to generate values for Z, and R for all of the populations, it sequences to a step 108 to perform a conventional significance test. In that operation (step 109) in connection with the value for Z, the noise likelihood determination sub-system 11 uses as the null hypothesis $$H_0: M = E(M) \quad (6)$$

as indicating that the points are randomly distributed, and uses the alternate hypothesis $$H_1: M \neq E(M) \quad (7)$$

as indicating that the points are not randomly distributed. It will be appreciated that, if the points are randomly distributed, the values for M, the average partition nonempty total in the population, would be distributed around E(M), the average occupancy total that would be expected if the points were randomly distributed, in a Gaussian distribution with a mean, or average, of E(M). The standard significance test, using values for M, E(M) and the normal deviate value Z, will indicate the likelihood that the null hypothesis is correct. The noise likelihood determination sub-system 11 may perform similar operations in connection with the values of R and the uniform dispersion plots generated for all of the populations, and will determine an assessment as to the likelihood that the signal as received by the transducer was totally random and if not determines a degree-of-randomness assessment. Subsystem 11 provides that assessment to the information processing sub-system 13. The information processing sub-system 13 can use the randomness assessment in determining the utility of having an output from information processing system 13 appear at output 14, as will be presently illustrated.

As exemplary embodiment of information processing sub-system 13 comprises submarine combat control equipment which is responsive to passive sonar signals received (i) by a towed linear array trailing behind the submarine, and (ii) by a spherical transducer array at the submarine's bow. Measurement information representing clock times at the ends of the time intervals employed in generating sample points is internally available in the combat control equipment. Measurement information representing an actual relationship between the contact and the towed array (signal power in a conical angle sector representing conical bearing angle of a sonar contact relative to the axis of the towed array) is gathered by the towed array. Measurement information representing a frequency characteristic (signal power in a sector of the signal's spectral frequency distribution function) may be gathered by either the spherical array or the towed array or both. A SNR measurement is gathered by the spherical array. The combat control equipment is of a type which employs Bayesian-based statistical cost function techniques and multiple hypothesis assessment techniques to enable the equipment to generate analytical solutions of contact state estimations of the location of the contact. The principles of both Bayesian-based cost function techniques and multiple hypotheses assessment techniques are conventional and well known. Using these techniques, meaningful statistical state estimates of a contact's location can be determined from signals as noisy as having a 50% degree-of-randomness (R=0.5). The fact that the submarine's sonar signal gathering equipment provides four mutually orthogonal items of information measurements, namely (i) conical angle of the contact, (ii) a frequency characteristic of the sonar signal, (iii) a clock time having a predetermined timed relationship to each time interval over which the signal is sampled, and (iv) SNR enables the combat system equipment to determine whether the processing performable by sub-system 13 should be available at output 14. For example, based upon a premise that sub-system can provide information yielding a meaningful state estimation of a contact's location with an input signal as noisy as having a degree of randomness R=0.5, but no higher, system 10 is provided with a suitable control to prevent appearance of any signal at output 14 if: (i) the signal from input sub-system 12 results in a "null hypothesis" determination (equation (6)), i.e., the input signal is essentially solely random noise; or (ii) the signal results in an "alternate hypothesis (equation (7)) determination, but sub-system 11 further determines the degree-of-randomness, R, of the signal from input sub-system is a value greater than 0.5. The control can prevent appearance of a signal at output 14 by any suitable mode such as blocking coupling from input sub-system 12 to sub-system 13, disabling sub-system 13, or blocking coupling from the output of sub-system 13 to output 14.

Although the noise likelihood determination sub-system 11 has been described in connection with assessing randomness in connection with a signal, such as an acoustic, electrical or electromagnetic signal, it will be appreciated that the sub-system 11 will find utility in other areas in which it is desirable to assess randomness. Also, although described in relation to a Cartesian coordinate system, sub-system 11 will also find utility in embodiments that employ a spherical coordinate system, or other coordinate systems.

The preceding description has been limited to a specific embodiment of this invention and the variations just discussed. It will be apparent, however, that even other variations and modifications may be made to the invention, with the attainment of some or all of the advantages of the invention. Therefore, it is the object of the appended claims to cover all such variations and modifications as come within the true spirit and scope of the invention.

What is claimed is:

1. A signal processing system comprising:
   an input including a transducer means, for receiving an analog signal which includes an information component and a noise component and for processing the analog signal to provide a digital signal comprising sample point measurements representing four mutually orthogonal items of measurement information, said sample point measurements being generated for a series of symbolic, four-dimensional spatial aperatures relative to a symbolic three-dimensional spatial reference system;
   an information processing sub-system for receiving said digital signal and for processing it to extract said information component;
   a noise likelihood determination sub-system for receiving said digital signal and for generating a random noise assessment that the digital signal comprises random noise, the noise likelihood determination sub-system controlling the information processing sub-system in response to the random noise assessment, the random noise assessment being further generated in response to an expected subspace point-occupancy rate assessment generated in response to subspace partitioning of the space for subspace nonempty assessment of sample points in comparison of spatial occupancy across the symbolic four-dimensional reference space between a like number of partitions nonempty reference points that are randomly distributed, the partition nonempty rate deviation further being generated for a plurality of selected sample point populations, each such selected population comprising a plurality of "N" sample point measurements, the random noise assessment further being generated in response to a standard significance test in connection with the subspace occupancy rate deviation assessments generated for said populations;

said noise likelihood determination sub-system further including reference point occupancy-distribution determination means for generating an expected occupancy-distribution value E(M) between reference points within a corresponding selected symbolic four-dimensional reference spatial region containing a sample point population as $$E(M) = k(1 - e^{-N/k})$$

Where "k" represents the four-dimensional spatial partitions number required for optimal performance of reference points in the selected region;

said noise likelihood determination sub-system still further including sample occupancy rate determination means for generating an actual subspace occupancy rate as M, being the result of an exhaustive search across all k subspace; and said noise likelihood determination subsystem yet further including total space and subspace occupancy rate assessment generating means for generating the occupancy rate of all partitions assessment value as $$Z = \frac{\overline{M} - E(M)}{\sigma M} \text{ where } \sigma M = \sqrt{k(1 - e^{-N/k})(k^{-N/k})}.$$

2. A signal processing system as defined in claim 1 in which said noise likelihood determination sub-system includes randomness statistic generating means for generating a randomness statistic in response to an expected occupancy rate parameter statistic, the noise likelihood determination sub-system generating the random noise assessment in response to the randomness statistic.

3. A signal processing system as defined in claim 2 in which the randomness statistic generating means includes means for generating a randomness statistic "R" in accordance with the relationship $$\frac{M}{E(M)}.$$

4. A signal processing system as defined in claim 1 wherein the received analog signal is an underwater acoustic signal and the mutually orthogonal items of measurement information of a sample point measurement comprise a clock time associated with the generation of a sample point measurement, an actual spatial relationship between the source of the acoustic signal and at least a portion of the transducer means, a frequency characteristic of the acoustic signal, and the measured signal-to-noise ratio (SNR).

5. A signal processing system as defined in claim 1 wherein said digital signal is the form of a multiplexed message containing each mutually orthogonal item of information as a discrete component of the multiplexed message, each sample point measurement is generated over a predetermined interval of clock time, the clock time measurement information comprises the clock time at an instant in timed relationship to the interval of time generating the sample point measurement, the actual spatial relationship measurement information comprises signal power in a sector of conical angle representing bearing of the source of the acoustic signal relative to a linear axis associated with the transducer means, the frequency characteristic measurement information comprises signal power in a sector of the spectral density distribution function of the acoustic signal, and the signal-to-noise ratio.

6. A signal processing system as defined in claim 1 wherein said symbolic spatial reference system is a Cartesian coordinate system.

* * * * *